(12) United States Patent
Hwang et al.

(10) Patent No.: US 12,407,030 B2
(45) Date of Patent: Sep. 2, 2025

(54) BATTERY PACK

(71) Applicant: SK On Co., Ltd., Seoul (KR)

(72) Inventors: Jae Il Hwang, Daejeon (KR); Min Song Kang, Daejeon (KR); Jin Su Han, Daejeon (KR); Bon Seok Ku, Daejeon (KR); Jun Hee Jung, Daejeon (KR); Sei Hoon Cho, Daejeon (KR)

(73) Assignee: SK On Co., Ltd., Seoul (KR)

( * ) Notice: Subject to any disclaimer, the term of this patent is extended or adjusted under 35 U.S.C. 154(b) by 599 days.

(21) Appl. No.: 17/729,398

(22) Filed: Apr. 26, 2022

(65) Prior Publication Data

US 2022/0344726 A1    Oct. 27, 2022

(30) Foreign Application Priority Data

Apr. 27, 2021  (KR) .................. 10-2021-0054170

(51) Int. Cl.
| | |
|---|---|
| *H01M 50/289* | (2021.01) |
| *H01M 10/34* | (2006.01) |
| *H01M 50/207* | (2021.01) |
| *H01M 50/211* | (2021.01) |
| *H01M 50/244* | (2021.01) |
| *H01M 50/271* | (2021.01) |
| *H01M 50/291* | (2021.01) |
| *H01M 50/298* | (2021.01) |
| *H01M 50/505* | (2021.01) |
| *H01M 50/507* | (2021.01) |
| *H01M 50/514* | (2021.01) |
| *H01M 50/529* | (2021.01) |

(52) U.S. Cl.
CPC .......... *H01M 10/34* (2013.01); *H01M 50/211* (2021.01); *H01M 50/271* (2021.01); *H01M 50/298* (2021.01); *H01M 50/505* (2021.01)

(58) Field of Classification Search
None
See application file for complete search history.

(56) References Cited

U.S. PATENT DOCUMENTS

| | | | |
|---|---|---|---|
| 10,079,377 | B2 | 9/2018 | Rutkowski et al. |
| 10,109,894 | B2 | 10/2018 | Tsujimura et al. |
| 10,181,623 | B2 | 1/2019 | Eom et al. |
| 10,615,385 | B2 | 4/2020 | Takahashi et al. |
| 10,862,181 | B2 | 12/2020 | Lee et al. |

(Continued)

FOREIGN PATENT DOCUMENTS

| | | |
|---|---|---|
| CN | 106025132 B | 7/2019 |
| CN | 111384329 A | 7/2020 |

(Continued)

*Primary Examiner* — Yoshitoshi Takeuchi
(74) *Attorney, Agent, or Firm* — The Webb Law Firm

(57) ABSTRACT

Disclosed is a battery pack in which a seating recess is provided in a horizontal frame so that connection members pass through the horizontal frame through the seating recess, thereby maximizing a height of the horizontal frame. A vertical frame cover is provided in a vertical frame to secure a height of the vertical frame side in each module space. A sealing member is provided in the seating recess to seal the seating recess. A double shielding structure, including a module space cover shielding each module space and a battery pack cover shielding a battery pack housing as a whole, is provided to maximize airtightness of the battery pack.

12 Claims, 19 Drawing Sheets

(56) References Cited

U.S. PATENT DOCUMENTS

| | | |
|---|---|---|
| 2016/0268652 A1 | 9/2016 | Eom et al. |
| 2017/0338454 A1 | 11/2017 | Millon |
| 2018/0105062 A1* | 4/2018 | Fees .................... H01M 50/298 |
| 2018/0130991 A1 | 5/2018 | Kim |
| 2018/0136213 A1 | 5/2018 | Lal et al. |
| 2018/0269443 A1 | 9/2018 | Takahashi et al. |
| 2018/0334022 A1 | 11/2018 | Rawlinson et al. |
| 2019/0267682 A1* | 8/2019 | Seo .................... H01M 10/613 |
| 2019/0393460 A1 | 12/2019 | Wesche et al. |
| 2020/0148066 A1* | 5/2020 | Sekar ................ H01M 50/262 |
| 2020/0185672 A1* | 6/2020 | Seo .................... H01M 10/6568 |
| 2020/0313245 A1 | 10/2020 | Feng et al. |
| 2021/0351455 A1* | 11/2021 | Kim ........................ B60L 50/66 |
| 2022/0209332 A1* | 6/2022 | Jung .................... H01M 50/249 |
| 2022/0255179 A1* | 8/2022 | Hwang ............... H01M 50/502 |
| 2022/0263189 A1* | 8/2022 | Ko ...................... H01M 50/358 |
| 2022/0344764 A1* | 10/2022 | Hwang ............... H01M 50/271 |
| 2022/0367952 A1* | 11/2022 | Hwang ............... H01M 50/244 |
| 2023/0022379 A1* | 1/2023 | Kang ................. H01M 50/258 |
| 2023/0071238 A1 | 3/2023 | Hwang |
| 2023/0101256 A1* | 3/2023 | Han .................... H01M 50/291 |
| | | 429/120 |
| 2023/0282927 A1* | 9/2023 | Shin .................... H01M 50/383 |
| | | 429/56 |
| 2023/0291059 A1* | 9/2023 | Lee .................... H01M 50/204 |
| 2024/0195006 A1* | 6/2024 | Park .................... H01M 50/30 |

FOREIGN PATENT DOCUMENTS

| | | |
|---|---|---|
| CN | 112310541 A | 2/2021 |
| JP | 5853417 B2 | 2/2016 |
| JP | 2019519886 A | 7/2019 |
| KR | 101328010 B1 | 11/2013 |
| KR | 101425569 B1 | 8/2014 |
| KR | 101743696 B1 | 6/2017 |
| KR | 1020170081901 A | 7/2017 |
| KR | 101773629 B1 | 8/2017 |
| KR | 1020180094632 A | 8/2018 |
| KR | 102061745 B1 | 1/2020 |
| KR | 1020210041950 A | 4/2021 |
| WO | 2020060341 A1 | 3/2020 |

* cited by examiner

BATTERY PACK

CROSS-REFERENCE TO RELATED APPLICATION

This application claims priority to Korean Patent Application No. 10-2021-0054170 filed Apr. 27, 2021, the disclosure of which is hereby incorporated by reference in its entirety.

BACKGROUND OF THE INVENTION

Field of the Invention

The following disclosure relates to a battery pack, and in particular, to a battery pack in which a seating recess is provided in a horizontal frame so that connection members pass through the horizontal frame through the seating recess, thereby maximizing a height of the horizontal frame, a vertical frame cover is provided in a vertical frame to secure a height of the vertical frame side in each module space, a sealing member is provided in the seating recess to seal the seating recess, and a double shielding structure, including a module space cover shielding each module space and a battery pack cover shielding a battery pack housing as a whole, is provided to maximize airtightness of the battery pack.

Description of Related Art

Secondary batteries having high ease of application and electrical characteristics such as high energy density according to product groups have been universally applied to electric vehicles (EVs) or hybrid vehicles (HEVs) driven by an electric drive source as well as portable devices. Secondary batteries have come into prominence as a new energy resource which is eco-friendly and improves energy efficiency in that no byproducts occur in using energy, as well as primary advantages of remarkably reducing the use of fossil fuels.

Types of currently widely used secondary batteries include lithium ion batteries, lithium polymer batteries, nickel cadmium batteries, nickel hydride batteries, nickel zinc batteries, and the like. An operating voltage of such a unit secondary battery cell, that is, a unit battery cell, is about 2.5 V to 4.6 V. Therefore, when a higher output voltage is required, a battery pack may be configured by connecting a plurality of battery cells in series. In addition, a battery pack may be configured by connecting a plurality of battery cells in parallel according to charge/discharge capacity required for the battery pack. Accordingly, the number of battery cells included in the battery pack may be set to be various according to required output voltages or charge/discharge capacities.

Meanwhile, in the case of configuring a battery pack by connecting a plurality of battery cells in series/parallel, generally, a method of first configuring a battery module including at least one battery cell and configuring a battery pack by adding other components using the at least one battery module. Here, the battery module or battery cells configuring the battery pack may be provided as a pouch-type secondary battery which is generally easily stacked.

FIG. 1 is a top view of a battery pack case of the related art, and FIG. 2 is a partial perspective view of FIG. 1. A battery pack case 50 may include a plate 51 corresponding to a bottom surface on which battery modules are placed, an outer frame 52 formed at an outer portion of the plate 51, and a plurality of inner frames 53 formed in a grid form on an inner side of the outer frame. Battery modules are separately placed in an internal space C defined by the plate 51 and each frame 52 and 53.

In the case of a battery module, a thermal runaway situation may occur in which ignition of a battery cell occurs inside the case due to overcharging, etc., and here, high temperature and high pressure gas, flames, and metal particles may occur in a corresponding trigger cell or a trigger module including the trigger cell. In this case, high temperature and high pressure gas or frames may thermally propagate from an internal space including the trigger module to another internal space to damage a normal module, and at the same time, frames or the like, that occur in the trigger module may be exposed externally of the battery pack case to lead to more significant secondary damage.

RELATED ART DOCUMENT

Patent Document (Patent document 1) Japanese Patent Publication No. 5853417 (published on Dec. 18, 2015).

SUMMARY OF THE INVENTION

An exemplary embodiment of the present invention is directed to providing a battery pack in which a seating recess is provided in a horizontal frame so that connection members pass through the horizontal frame through the seating recess, thereby maximizing a height of the horizontal frame, a vertical frame cover is provided in a vertical frame to secure a height of the vertical frame side in each module space, a sealing member is provided in the seating recess to seal the seating recess, and a double shielding structure, including a module space cover shielding each module space and a battery pack cover shielding a battery pack housing as a whole, is provided to maximize airtightness of the battery pack.

In one general aspect, a battery pack includes: a plate in which battery modules are placed; an outer frame provided with a predetermined height at an outer portion of the plate; and at least one inner frame dividing the internal space so that the battery modules are placed in the internal space formed by the plate and the outer frame, wherein the internal frame include at least one seating recesses formed by indenting an upper surface of the internal frame downward.

The internal frame may include at least one horizontal frame and at least one vertical frame dividing the internal space in a grid form.

The seating recess may include a central seating recess provided near an intersection at which the vertical frame and the horizontal frame meet.

The central seating recess may include a first central seating recess and a second central seating recess provided on both sides with respect to a center of the vertical frame.

The seating recess may include a side seating recess provided on at least one of both ends of the horizontal frame in a length direction.

The vertical frame may include a plurality of unit vertical frames, and the horizontal frame may be disposed between two adjacent unit vertical frames among the plurality of unit vertical frames.

The battery pack may further include a plurality of unit vertical frame covers provided at upper portions of the plurality of unit vertical frames to cover upper portions of the unit vertical frames, respectively.

The battery pack may further include: a connection member including at least one of a busbar electrically connecting the battery modules and a wire harness providing an electrical signal to electrical equipment provided in a battery housing, wherein at least a portion of the connection member is seated in the seating recess.

The battery pack may further include: a sealing member coupled to the seating recess, wherein the sealing member seals a space other than a space occupied by the connection member in the seating recess.

At least a portion of the connection member and the sealing member may be coupled to each other.

The horizontal frame may have the same height as the outer frame, and the vertical frame may be lower than the horizontal frame.

The connection member may be located above the vertical frame, and a vertical frame cover covering the connection member may be further provided above the vertical frame.

The battery pack may further include: a plurality of module space covers provided above a plurality of module spaces formed by dividing the internal space in a grid form to shield the module spaces, respectively; and a battery pack cover provided above the plurality of module space covers and above the battery pack housing to shield the internal space of the battery pack housing as a whole.

The plurality of module space covers and the battery pack covers may be spaced apart from each other.

A seating structure on which the module space cover may be placed may be provided on a side surface of the horizontal frame, and the seating structure may be provided in a position lower than an upper surface of the horizontal frame.

The battery module may include a battery cell assembly including a pouch-type battery cell and a module case fixing the battery cell assembly, and the pouch-type battery cell may be directly seated on the plate through a thermally conductive member.

Other features and aspects will be apparent from the following detailed description, the drawings, and the claims.

DESCRIPTION OF THE INVENTION

Hereinafter, exemplary embodiments will be described in detail with reference to the accompanying drawings.

Figure 1:
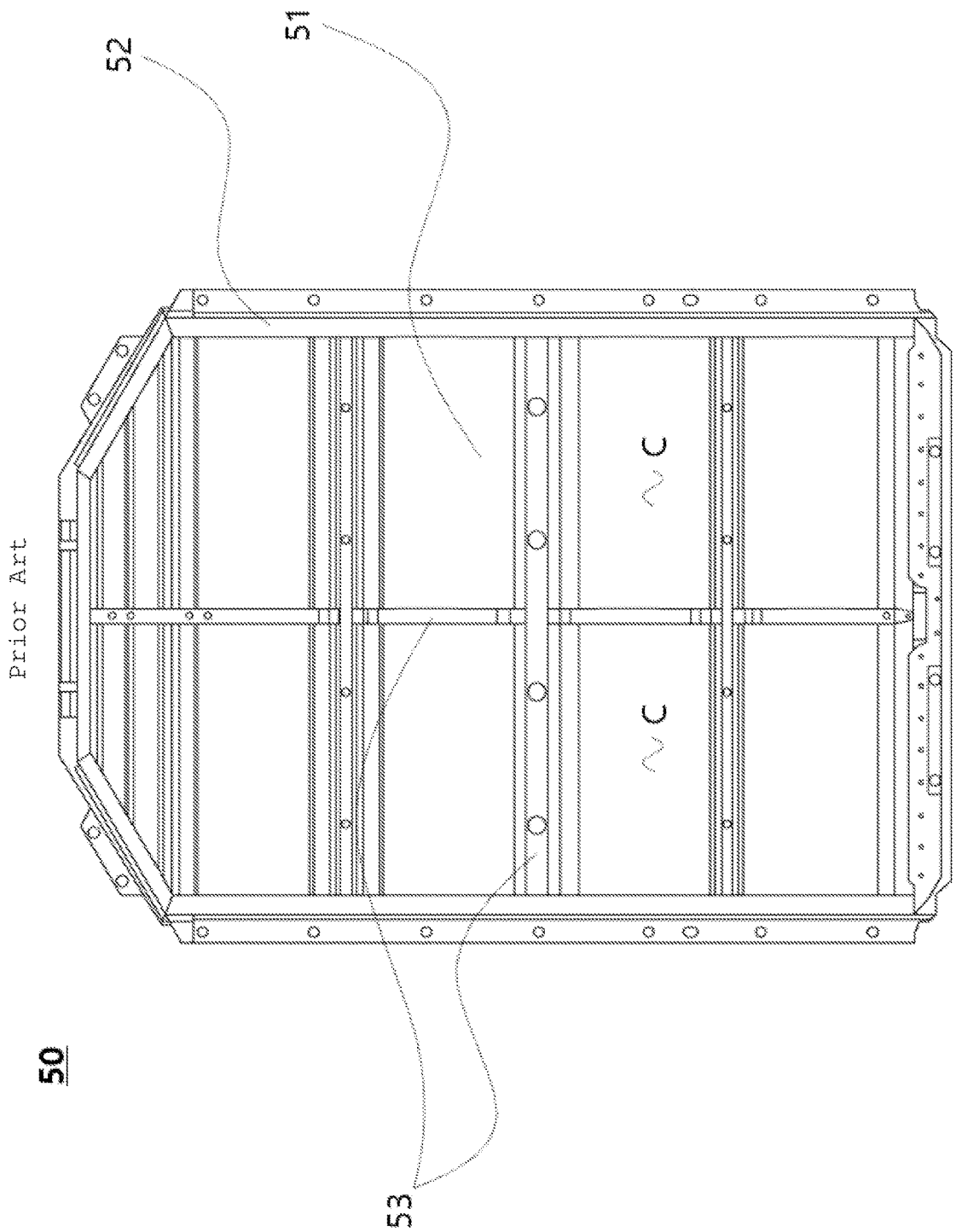
FIG. 1 is a top view of a battery pack case of the related art.
Figure 2:
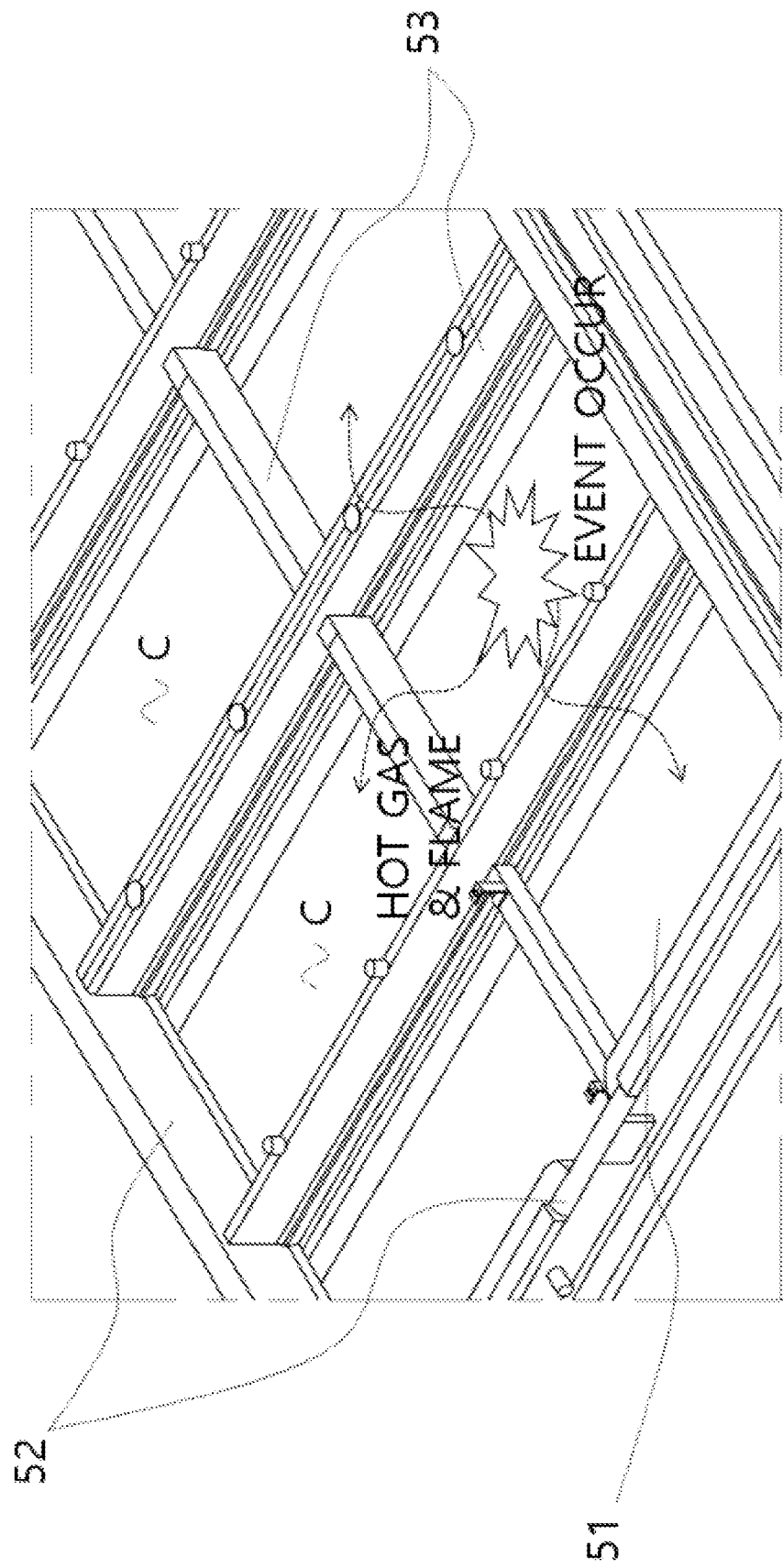
FIG. 2 is a partial perspective view of FIG. 1.
Figure 3:
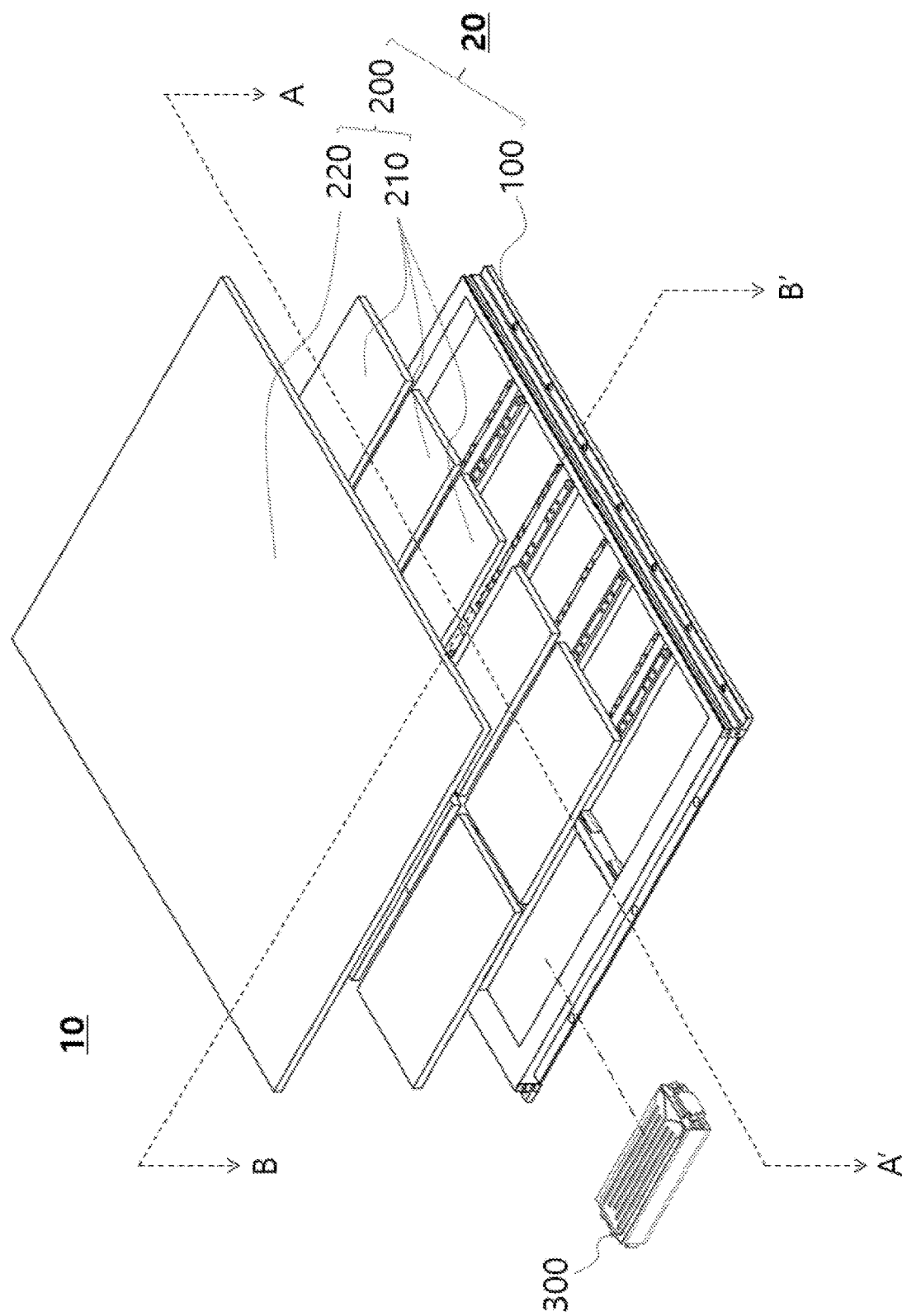
FIG. 3 is an exploded perspective view of a battery pack according to an exemplary embodiment of the present invention.

FIG. 3 is an exploded perspective view of a battery pack 10 according to an exemplary embodiment of the present invention. The battery pack 10 of the present invention may include a battery pack case 20 and battery modules 300 accommodated in the battery pack case 20. The battery pack case 20 may include a battery pack housing 100 and an upper cover 200 covering an upper portion of the battery pack housing.

Figure 4:
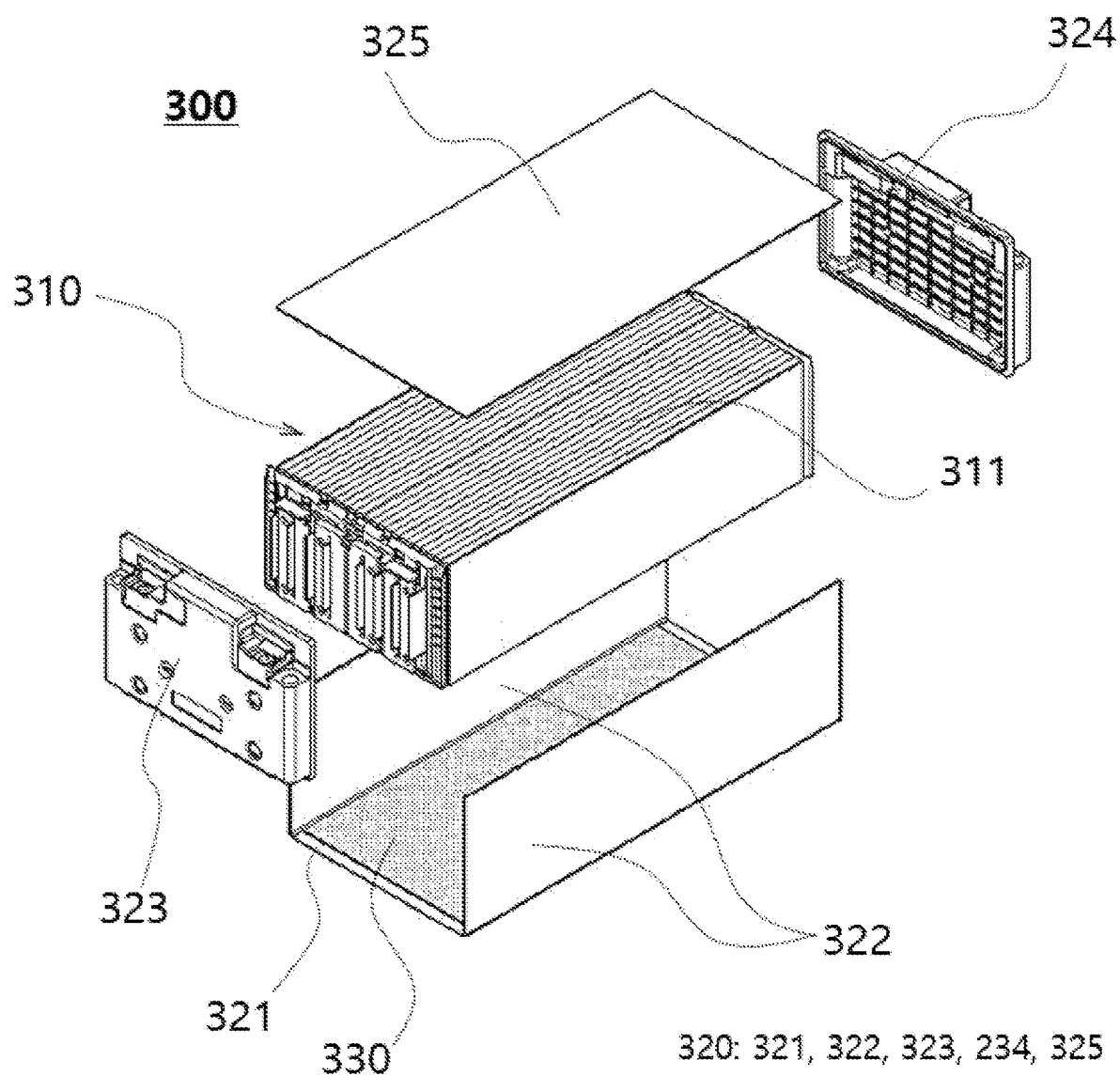
FIG. 4 is an exploded perspective view of the battery module of the related art.

First, the battery module 300 may be a general battery module. For example, FIG. 4 shows the battery module 300 according to an exemplary embodiment of the present invention. The battery module 300 may be formed by accommodating a battery cell assembly including stacked battery cells 310 with multiple battery cells 311 stacked therein in a case 320. The case 320 may include a lower plate 321 covering a lower surface of the battery cell assembly including a plurality of stacked battery cells, a side plate 322 covering both side surfaces of the battery cell assembly, a front cover 323 covering a front surface of the battery cell assembly, a rear cover 324 covering a rear surface of the battery cell assembly, and an upper cover 325 covering an upper surface of the battery cell assembly. The battery cell of the battery module may be provided as a pouch-type secondary battery, an angular secondary battery, or a cylindrical secondary battery, and the battery module of the present invention may be a battery module including pouch-type secondary batteries as shown in FIG. 4. Meanwhile, the battery module may refer to a battery module assembly formed by connecting two or more single battery module structures as described above.

Figure 5:
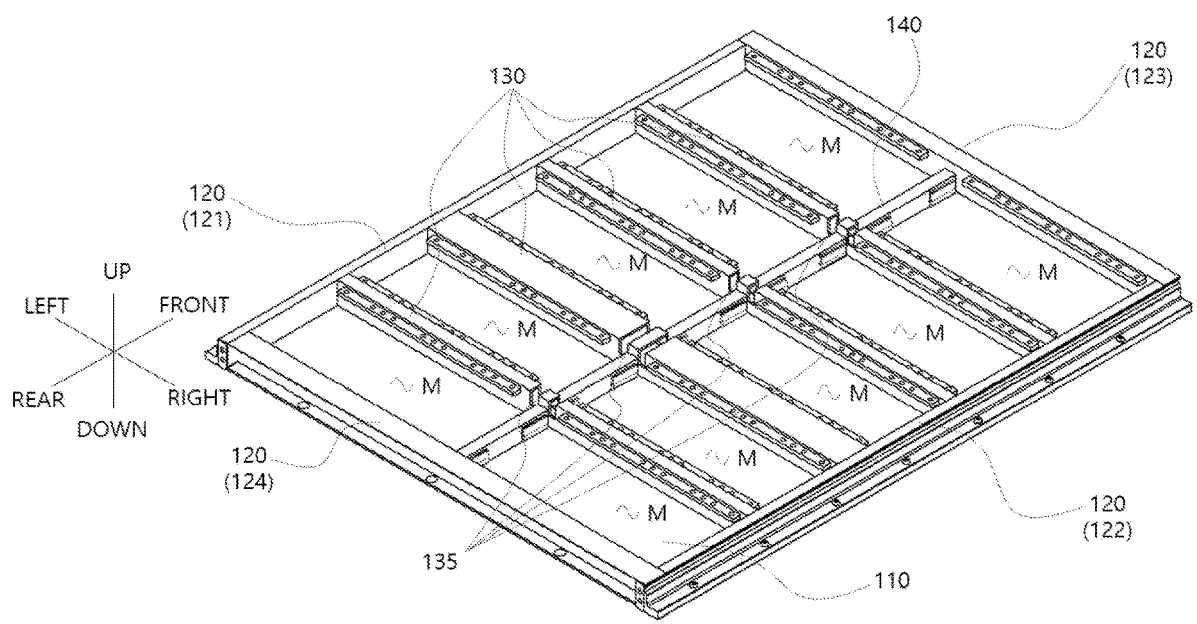
FIG. 5 is a perspective view of a battery pack housing according to an exemplary embodiment of the present invention.

Hereinafter, the battery pack housing 100 of the present invention will be described first. The battery pack housing 100 provides a space in which the battery modules 300 are seated. In the present invention, the battery pack housing 100 refers to a housing excluding the upper cover 200 from the battery pack case 20. FIG. 5 is a perspective view of a battery pack housing according to an example of the present invention. As shown, the battery pack housing 100 according to an example of the present invention may include a plate 110, an outer frame 120, and an inner frame, and the inner frame may include a horizontal frame 130 and a vertical frame 140.

The plate 110 is a place where the battery modules are placed. The plate may be configured in a flat plate shape having an approximately large area, and may be located under the battery modules to cover a lower portion of the battery module.

The outer frame 120 is formed at a predetermined height on an outer portion of the plate. The outer frame 120 may include a left frame 121, a right frame 122, a front frame 123, and a rear frame 124 which are arranged on the left, right, front, and rear of the plate along an outer circumference of the plate to cover side surfaces of the battery modules.

The inner frame divides the internal space formed by the plate 110 and the outer frame 120 into a plurality of spaces, and the inner frame may include at least one seating recess formed by indenting a portion of an upper surface of the inner frame downward. The inner frame may include the horizontal frame 130 and the vertical frame 140, and accordingly, the horizontal frame 130 and the vertical frame 140 may have a seating recess having the structure described above. Hereinafter, the present invention will be described based on the seating recess formed in the horizontal frame 130.

More specifically, the horizontal frame 130 and the vertical frame 140 are installed in a grid form on an inner side of the outer frame 120 to divide the internal space defined in a box shape by the plate 110 and the outer frame 120 into a plurality of areas. The horizontal frame 130 may be installed in a horizontal direction (i.e., in a left-right direction among the directions indicated in FIG. 5) on an upper surface of the plate 110, and the vertical frame 140 may be installed in a vertical direction (i.e., in a front-rear direction among the directions indicated in FIG. 5) on the upper surface of the plate 110.

FIG. 5 shows that four horizontal frames 130 are installed and one vertical frame 140 is installed in the center, but the present invention is not limited thereto, and a plurality of vertical frames 140, as well as the horizontal frames 130, may be provided, and only one horizontal frame 130 may be provided. In this manner, since the horizontal frame 130 and the vertical frame 140 are installed in a grid form, the internal space defined by the plate and the outer frame is divided into a plurality of areas, and thus, the battery modules may be individually seated in the corresponding areas, respectively. In this case, each of the areas will be defined as a module area M in the present invention.

Here, the horizontal frame 130 of the present invention may include a seating recess in which a connection member to be described later may be seated. More specifically, FIG. 6 is a side view of a horizontal frame according to an exemplary embodiment of the present invention, and as shown, at least one seating recess 135 may be formed in the horizontal frame 130, and here, the seating recess 135 may be formed by indenting an upper surface of the horizontal frame 130 downward.

The seating recess 135 may include a central seating recess 136, and the central seating recess 136 may be formed near an intersection at which the vertical frame 140 and the horizontal frame 130 meet. That is, referring to FIG. 5 again, the intersection formed as the vertical frame 140 and the horizontal frame 130 meet may be located near the center of the horizontal frame 130, and the seating recess 135 may be located near the center of the horizontal frame 130 in which the intersection is located. Alternatively, when the intersection formed as the vertical frame 140 and the horizontal frame 130 meet is eccentric to one side near the center of the horizontal frame 130, the seating recess 135 may also be formed near the eccentric intersection.

The central seating recess 136 may include a first central seating recess 136-1 and a second central seating recess 136-2 formed on both sides with respect to the center of the vertical frame 140. That is, as shown in FIGS. 5 and 6, the central seating recess 136 may be formed near the intersection of the horizontal frame 130 and the vertical frame 140 and may face each other with reference to the center of the vertical frame 140, i.e., in a length direction in which the vertical frame 140 extends. Accordingly, based on the vertical frame 140, a structure of the battery pack housing positioned on the left of the vertical frame 140 and a structure of the battery pack housing positioned on the right of the vertical frame 140 may be symmetric with each other.

Figure 6:
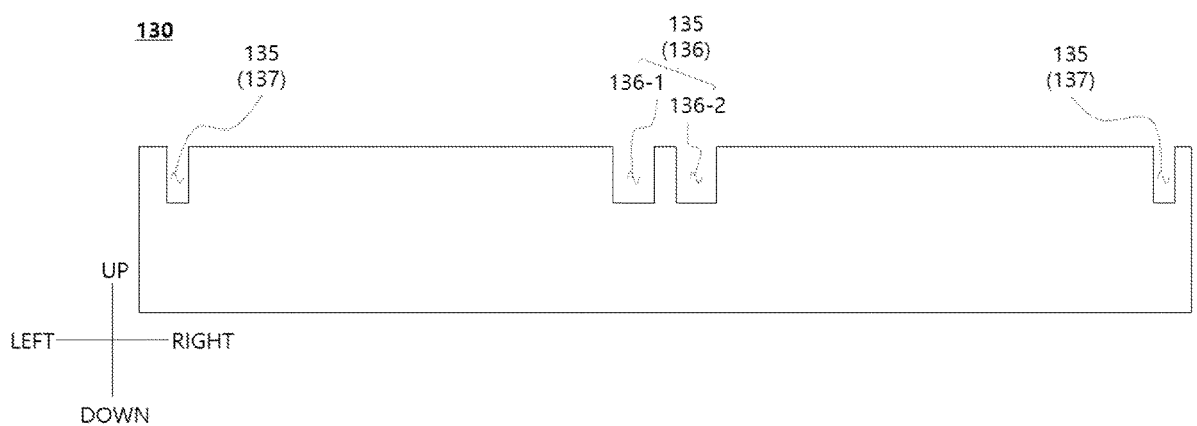
FIG. 6 is a side view of a horizontal frame according to an exemplary embodiment of the present invention.

In addition, the seating recess 135 may include a side seating recess 137, and the side seating recess 137 may be formed on at least one of both ends of the horizontal frame 130 in the length direction (i.e., in the left-right direction among the directions indicated in FIG. 6). FIG. 6 shows that side seating recesses are formed at both ends of the horizontal frame in the length direction, respectively.

Figure 7:
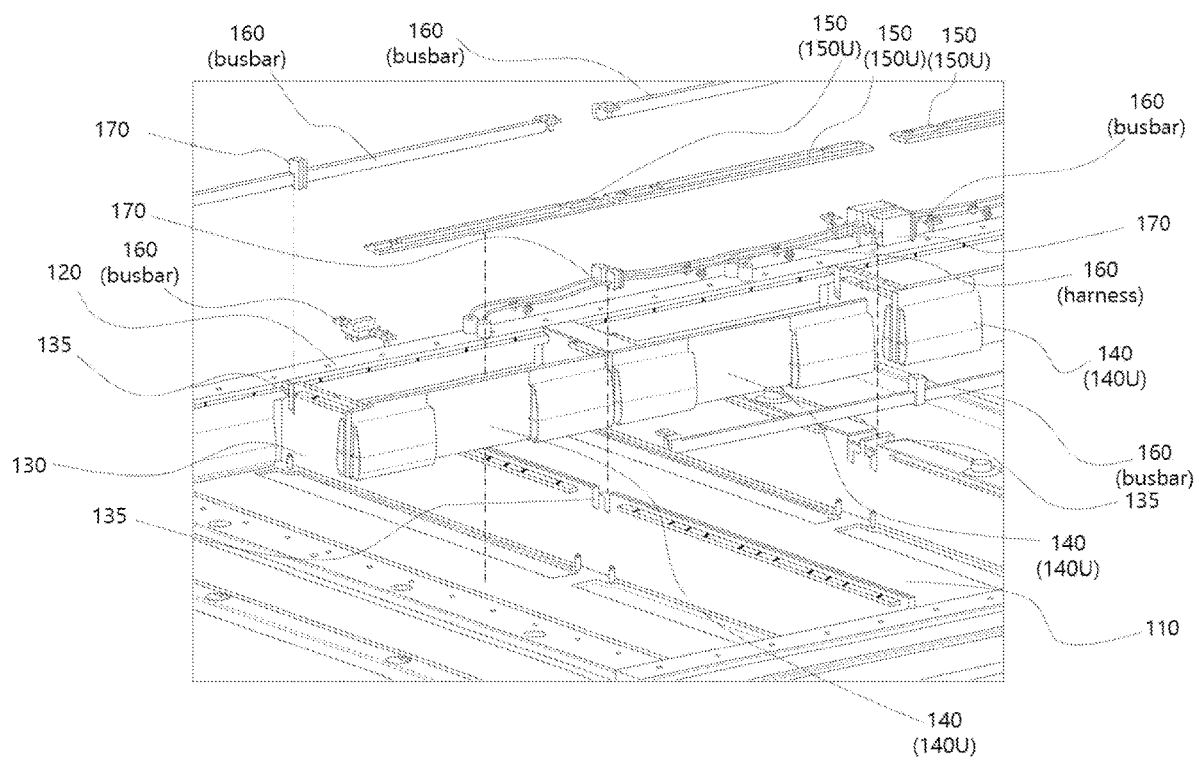
FIG. 7 is an exploded perspective view of a battery pack housing according to another exemplary embodiment of the present invention.
Figure 8:
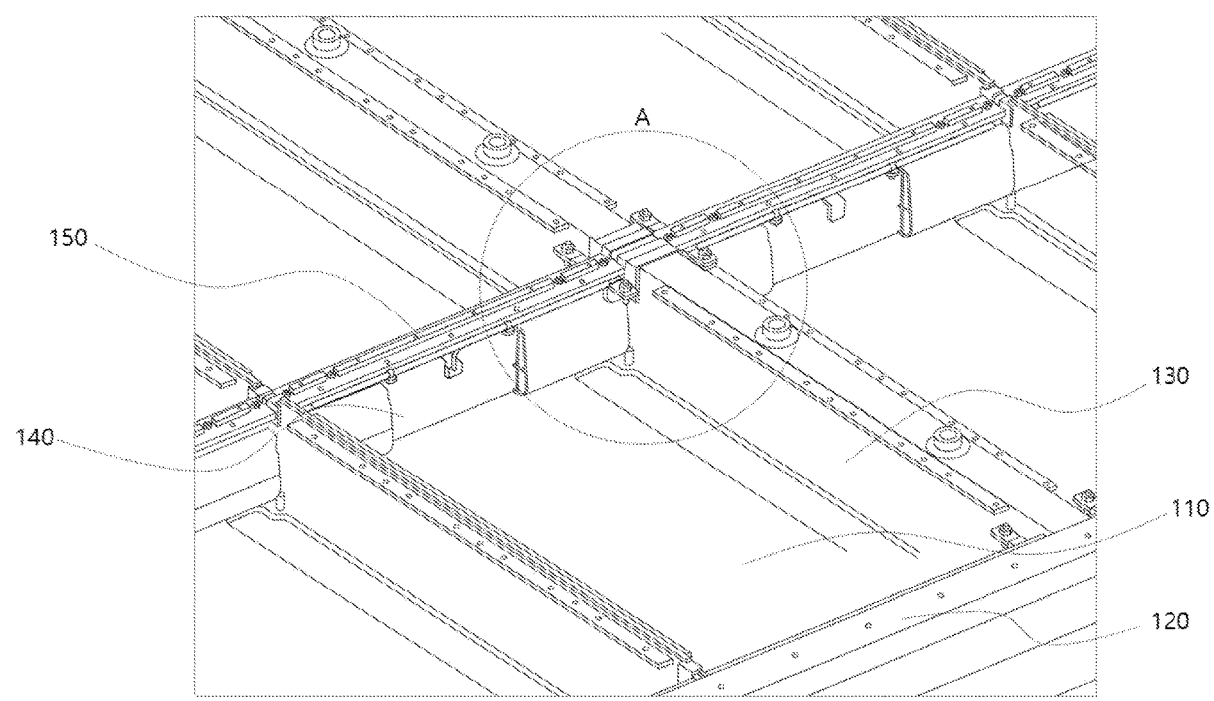
FIG. 8 is a combined view of FIG. 7.
Figure 9:
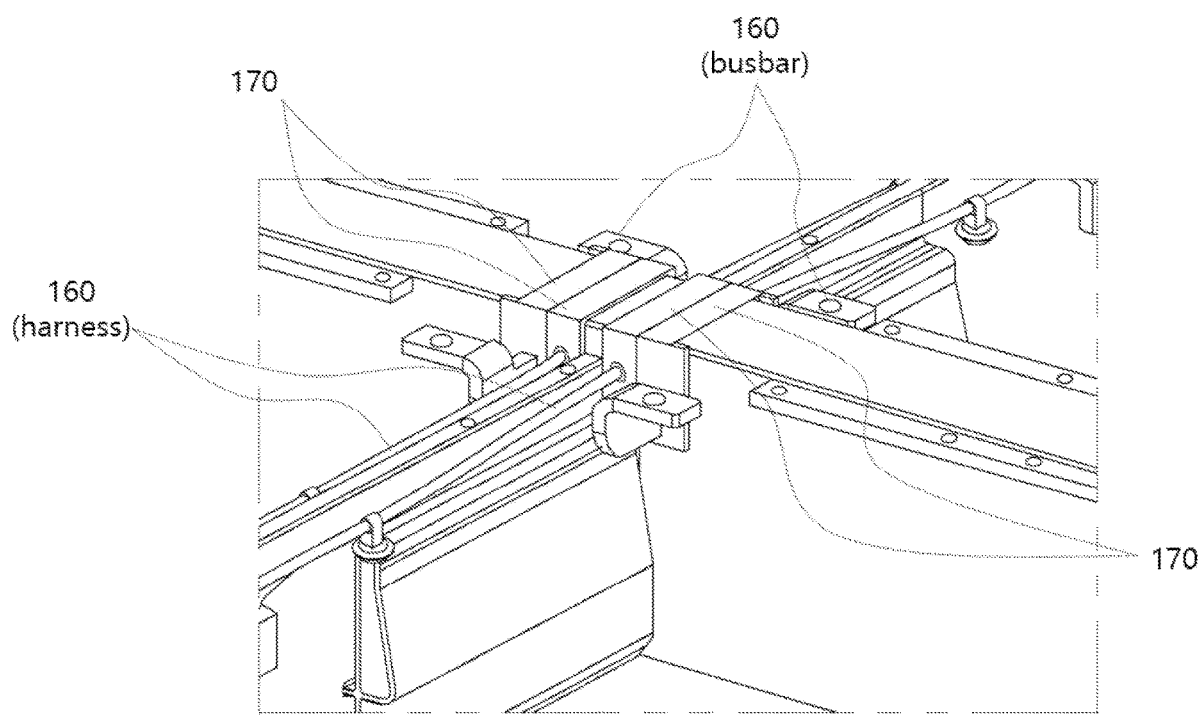
FIG. 9 is an enlarged view of a region A of FIG. 8.
Figure 10:
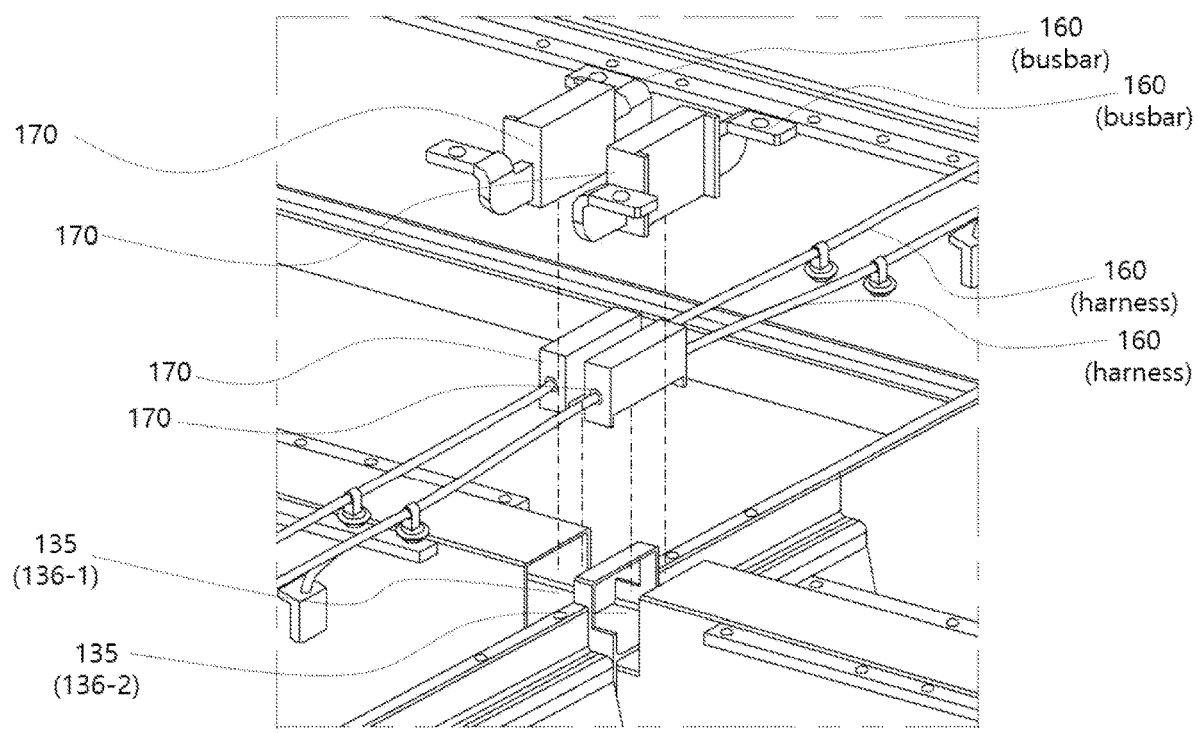
FIG. 10 is an exploded perspective view of FIG. 8.

Hereinafter, a battery pack housing 100 according to another example of the present invention will be described. FIG. is an exploded perspective view of a battery pack housing according to another example of the present invention, FIG. 8 is a combined view of FIG. 7, FIG. 9 is an enlarged view of a region A of FIG. 8, and FIG. 10 is an exploded view of FIG. 8. The battery pack housing 100 according to the present example may further include a vertical frame cover 150, a connection member 160, and a sealing member 170, in addition to the plate 110, the outer frame 120, the horizontal frame 130, and the vertical frame 140 described above.

In this example, the horizontal frame 130 is formed to have the same height as the outer frame 120, the vertical frame 140 may be formed to be lower than the horizontal frame 130. The horizontal frame 130 may be formed to have a height equal to a height of the left frame 121 and the right frame 122 on both sides of the outer frame 120 in a width direction, and the vertical frame 140 may be formed to be lower than the height of the horizontal frame 130.

In this case, since airtightness between the two adjacent module spaces M adjacent in the horizontal direction with the vertical frame 140 therebetween may be reduced by the low height of the vertical frame 140, and thus, the vertical frame cover 150 may be further provided to complement the reduction in airtightness. The vertical frame cover 150 may be provided above the vertical frame 140 to cover the vertical frame 140.

Meanwhile, in this example, the vertical frame 140 may be formed of a plurality of unit vertical frames 140U. That is, referring to FIG. 7, the horizontal frame 130 is formed to be integrated and installed in the horizontal direction between the left frame 121 and the right frame 122, and the vertical frame 140 may include a plurality of separated unit vertical frames 140U inserted between the rear frame 124 and the horizontal frame 130, between two adjacent horizontal frames 130, and between the horizontal frame 130 and the front frame 123 and installed in a vertical direction, and accordingly, the horizontal frame 130 may be disposed between two adjacent unit vertical frames 140U among the plurality of vertical frames 140U. In this manner, when the vertical frame 140 includes a plurality of unit vertical frames 140U, the vertical frame cover 150 described above also includes a plurality of separate unit vertical frame covers 150U which may be provided on top of the plurality of unit vertical frames 140U, respectively.

Further, in this example, a connection member 160 including a busbar for electrically connecting the battery modules M and a wire harness for providing electrical signals to electrical equipment provided in the battery pack housing may be further included. The busbar may be a rod-shaped conductor connecting two adjacent battery modules, and the wire harness may be a unit providing power and electrical signals to electrical equipment, for example, a cell management unit (CMU), and including peripheral components such as wires and connectors integrated therein.

Here, at least a portion of the connection member 160 may be seated in the seating recess 135. For example, referring to FIG. 10, the horizontal frame 130 may include the seating recess 135 including a first central seating recess 136-1 and a second central seating recess 136-2, and here, a central portion of the busbar and a portion of the harness may be seated in the first central seating recess 136-1, and a central portion of another busbar and a portion of another harness may be seated in the second central seating recess 136-2. In addition, referring to FIG. 7, the horizontal frame 130 may have side seating recesses 137 formed at both ends of the horizontal frame 130 in the length direction, and a central portion of the extended busbar may be seated in the side seating recess 137.

Here, in the present invention, a sealing member 170 may be provided in the seating recess 135. Referring to FIG. 10, the sealing member 170 may be provided in the seating recess 135 to seal a space other than the space occupied by the connection member 160 in the seating recess 135. The sealing member may include a fire-resistant, heat-resistant, non-flammable material, and, for example, such material may correspond to MICA, resin, EPDM, composite materials, and metal materials.

Here, as shown in FIG. 10, at least a portion of the connection member 160 and the sealing member 160 may be coupled to each other. That is, the sealing member 170 may be coupled to the corresponding portion of the connection member 160 to correspond to the portion that is seated in the seating recess 135.

Figure 11:
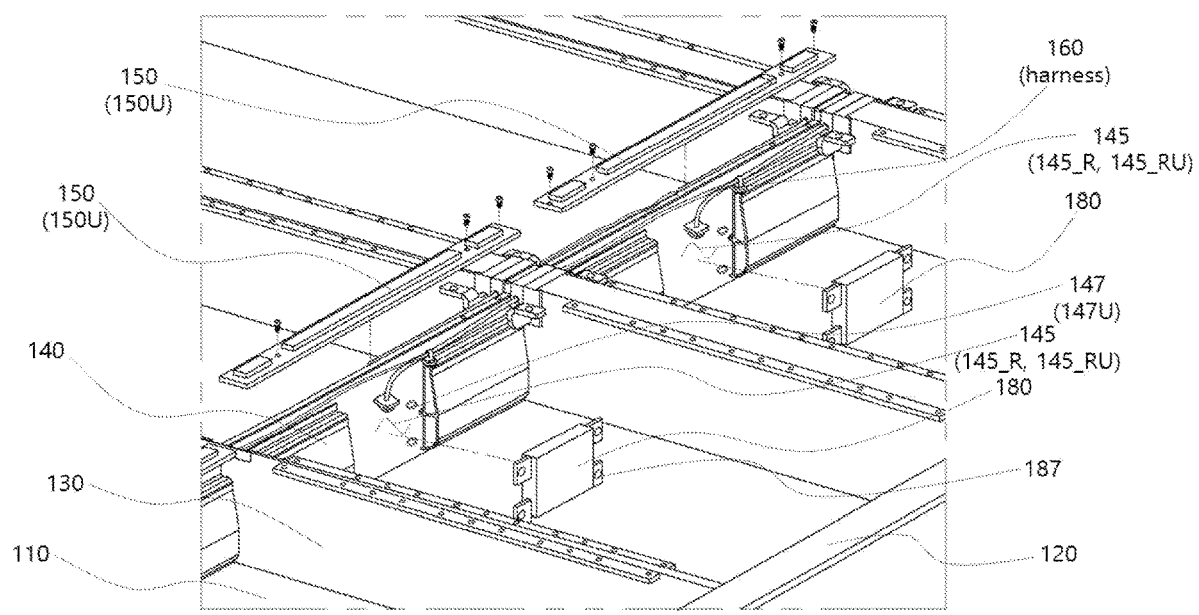
FIG. 11 is an exploded perspective view of a battery pack housing according to another exemplary embodiment of the present invention.
Figure 12:
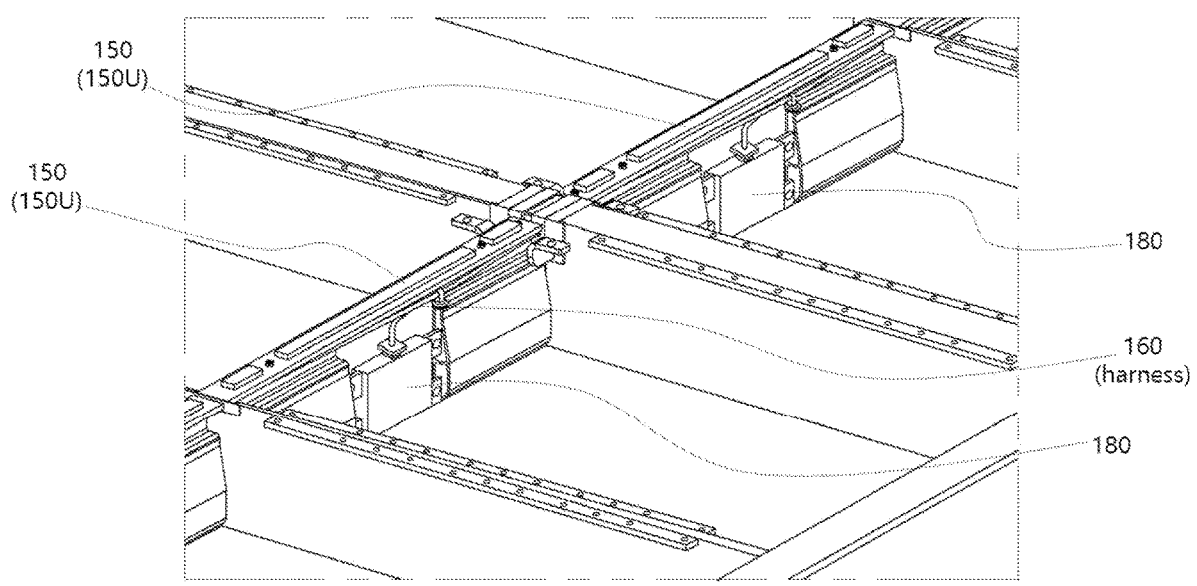
FIG. 12 is a combined view of FIG. 11.

In the following, a battery pack housing 100 according to another example of the present invention will be described. FIG. 11 is an exploded perspective view of a battery pack housing according to another example of the present invention, and FIG. 12 is a combined view of FIG. 11. The battery pack housing 100 according to the present example may further include a vertical frame cover 150, a connection member 160, and a sensing member 180, in addition to the plate 110, the outer frame 120, the horizontal frame 130, and the vertical frame 140 described above.

In this example, the vertical frame 140 may include at least one of one side fastening recess 145_R in which one surface (e.g., a right surface of the vertical frame) of the vertical frame 140 is concave inward with respect to each of the module spaces M located in one direction (e.g., a rightward direction of the vertical frame) of the vertical frame 140, among the plurality of module spaces M and the other side fastening recess 145_L in which the other surface (e.g., a left surface of the vertical frame) of the vertical frame 140 with respect to each of the module spaces M located in the other direction (e.g., a leftward direction of the vertical frame) of the vertical frame 140 among the plurality of module spaces M. That is, the vertical frame 140 of the present invention may include a fastening recess 145 formed such that at least one of the side surfaces of the vertical frame 140 is recessed inward, and here, the fastening recess 145 includes one side fastening recess 145_R and the other side fastening recess 145_L described above.

Figure 13:
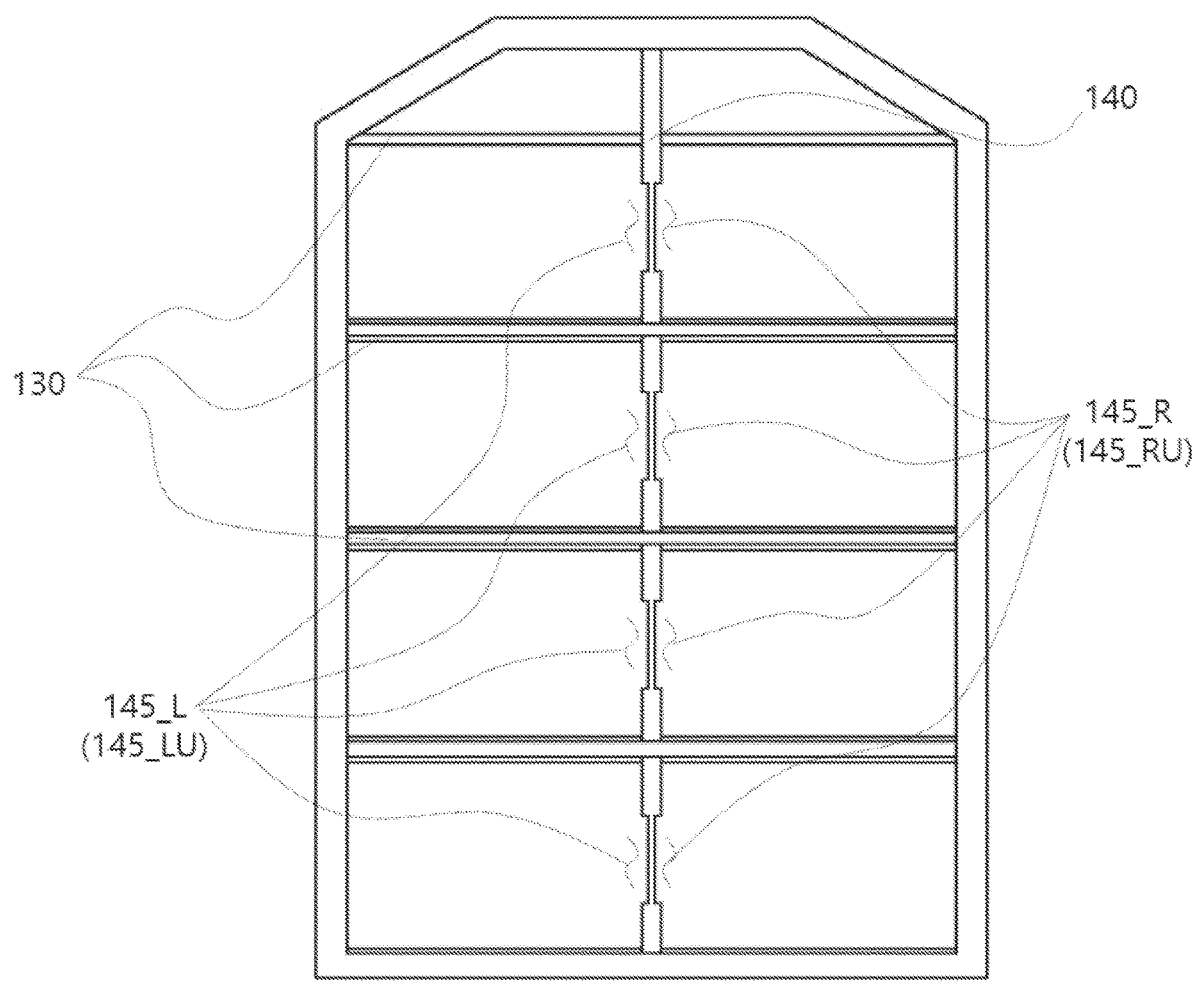
FIGS. 13 and 14 are top views of a battery pack housing according to another exemplary embodiment of the present invention.
Figure 14:
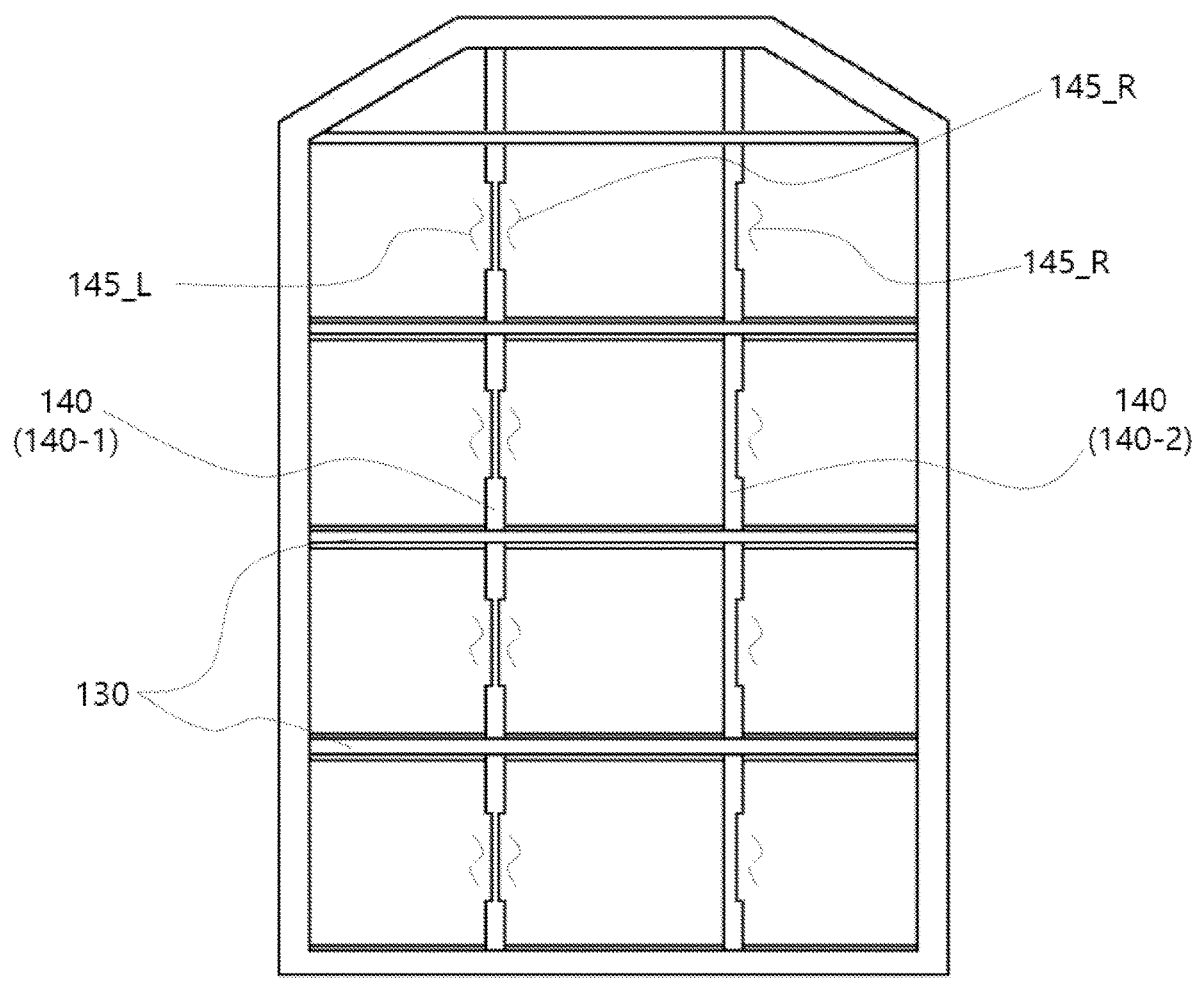

FIGS. 13 and 14 are top views of a battery pack housing according to another example of the present invention. FIG. 13 shows that one vertical frame 140 is provided and one side fastening recess 145_R and the other side fastening recess 145_L are formed on both sides of the vertical frame 140 with respect to each of the module spaces M located on both sides (i.e., both one side and the other side) of the vertical frame 140, and FIG. 14 shows that two vertical frames 140 are provided, and in the case of a first vertical frame 140-1 provided on the left in the drawing, one side fastening recess 145_R and the other side fastening recess 145_L are formed on both sides of the first vertical frame 140-1 with respect to each of the module spaces M located on both sides of the first vertical frame 140-1, and in the case of a second vertical frame 140-2, one side fastening recess 145_R is formed on the right side of the second vertical frame 140-2 with respect to each of the module spaces M located on the right side (e.g., one side) of the second vertical frame 140-2. That is, in this example, at least one of the one side fastening recess 145_R and the other side fastening recess 145_L may be formed in at least one of the vertical frames 140 forming each module space M.

Figure 15:
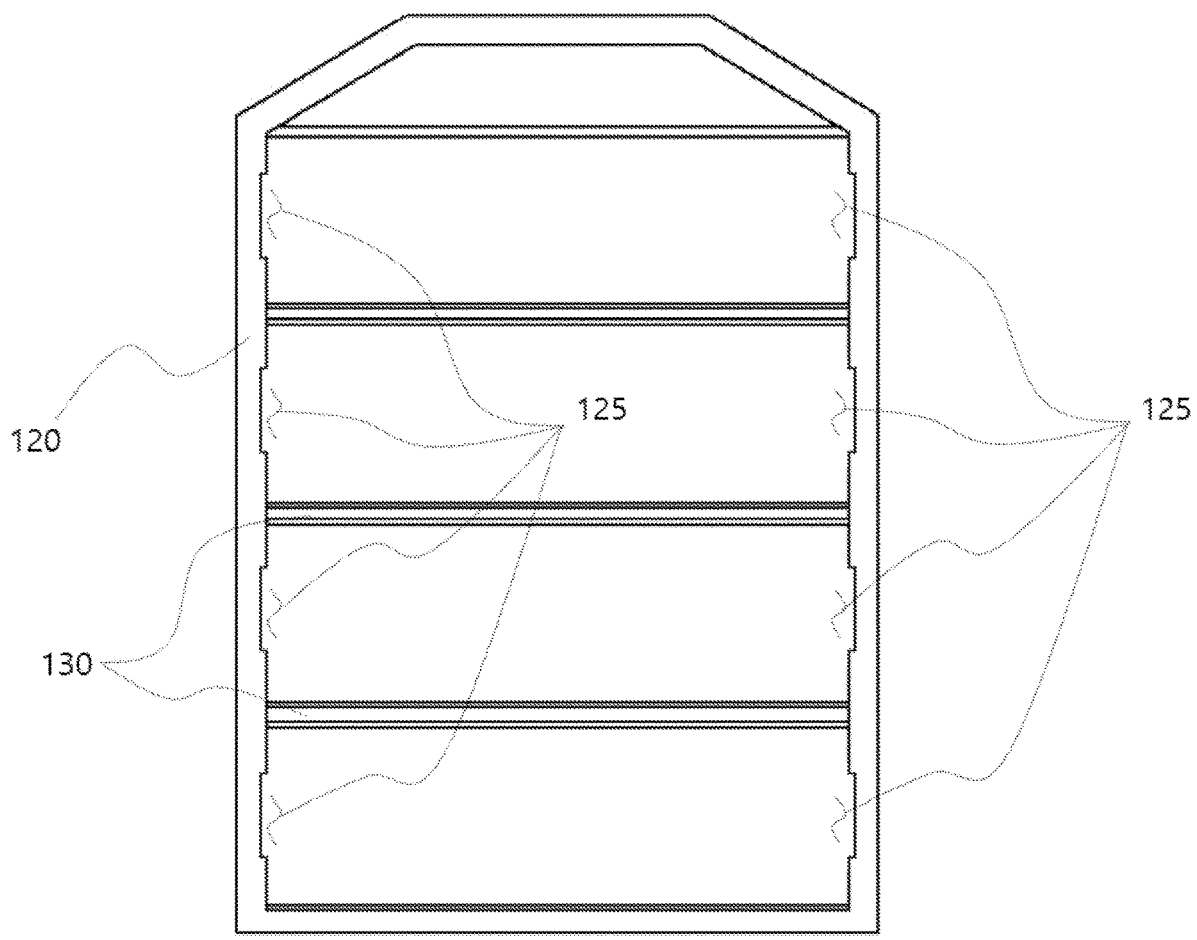
FIG. 15 is a top view of a battery pack housing according to another exemplary embodiment of the present invention.

FIG. 15 is a top view of a battery pack housing according to another exemplary embodiment of the present invention. As shown, in the case of the present exemplary embodiment, unlike FIGS. 13 and 14, the module space M may be configured only with horizontal frames without a separate vertical frame). In this manner, even when the module space is divided only by horizontal frames, the seating recess 135 according to the present invention may be formed to have the same structure as in FIG. 6, and such a structure as the fastening recess 145 of the vertical frame 140 described above may be formed on the side surface of the outer frame 120 of the battery pack housing 100. Accordingly, in this case, a fastening recess 125 may be formed on the side surface of the outer frame 120.

As described above, the present invention may have the fastening recess so that at least one of both side surfaces of each of the outer frame and the inner frame is indented inward in at least one of the outer frame and the inner frame. More specifically, in the outer frame 120, an outer frame fastening recess 125 may be formed by indenting inward a partial region of a side surface corresponding to a side surface of the outer frame 120 facing the module space M, and, in particular, in the vertical frame 140 of the inner frame, a vertical frame fastening recess 145 may be formed by indenting inward a partial region of at least one of both side surfaces of the vertical frame 140. Meanwhile, hereinafter, the present invention will be described based on the vertical frame 140.

In this example, a sensing member 180 may be fastened to each of one side fastening recess 145_R and the other fastening recess 145_L formed in the vertical frame 140. The sensing member 180 is electronic equipment that measures a state of the battery module 300 individually seated in each module space M, and may be, for example, a battery management unit (CMU) described above.

Here, the one side fastening recess 145_R and the other side fastening recess 145_L formed in the vertical frame 140 may have a fastening recess fixing unit 147 for fixing a sensing member fastened to the corresponding fastening recesses 145_R and 145_L. As shown in FIG. 11, the one or the other side fastening recesses 145_R and 145_L formed in the vertical frame 140 may have a fixing unit 147 for coupling the sensing member 180 to the corresponding fastening recess. Further, the sensing member 180 may have a fixing bracket 187 corresponding to the fixing unit 147. That is, referring to FIG. 11, the sensing member 180 may be inserted into one or the other side fastening recesses 145_R and 145_L formed in the vertical frame 140, the fixing bracket 187 may be provided on an outer side of the sensing member 180 to fix the sensing member 180, and a bolt coupling portion protruding from an outer wall of the fastening recesses 145_R and 145_L in positions corresponding to the fixing bracket 187, so that the sensing member 180 may be firmly fixed to the outer wall of the fastening recesses 145_R and 145_L through bolting coupling between the bracket 187 of the sensing member 180 and the bolt coupling portion. The fixing unit formed in the fastening recess may be, for example, a bolt coupling portion.

Meanwhile, in this example, a vertical frame cover 150 may be further provided on the vertical frame 140. In addition, the vertical frame 140 may include a plurality of unit vertical frames 140U, and each of the unit vertical frames 140U may include at least any one of a unit one side fastening recess 145_RU in which one side surface of the unit vertical frame 140U is formed to be concave inward with respect to the module space M located in one direction of each of the unit vertical frames 140U and a unit other side fastening recess 145_LU in which the other side surface of the unit vertical frame 140U is formed to be concave inward with respect to the module space M located in the other direction of each of the unit vertical frames 140U. Here, the unit one side fastening recess and the unit other side fastening recess may have a unit fastening recess fixing unit 147U for fixing a sensing member fastened to the unit one side fastening recess and the unit other side fastening recess.

In addition, when the vertical frame 140 includes the plurality of unit vertical frames 140U, the vertical frame cover 150 may also include a plurality of unit vertical frame covers 150U provided in an upper portion of each of the unit vertical frames 140 to cover the upper portion of each of the unit vertical frames 140U. Furthermore, also, in this example, a seating recess 135 is formed in the horizontal frame 130, and at least a portion of the connection member 180 may be seated on the seating recess 135. In this example, detailed content overlapping the previous content will be omitted.

Hereinafter, the battery pack case 20 will be described. Referring back to FIG. 3, the battery pack case 20 may include the battery pack housing 100 and the upper cover 200 described above, and in this case, the upper cover 200 may include a plurality of module space covers 210 and a battery pack cover 220.

The module space cover 210 may be provided on each of the plurality of module spaces M to shield each module space M, and module space covers 210 as many as the number of each module space M may be provided. That is, the module space cover 200 may be positioned above each battery module 300 seated in each module space M to cover the upper portion of each battery module 300. Here, the module space cover 200 may include a fire-resistant, heat-resistant, and non-flammable material, and, for example, such material may correspond to MICA, resin, EPDM, composite materials, and metal materials.

The battery pack cover 220 may be provided on top of the plurality of module space covers 200 and on the top of the battery pack housing 100 to shield the internal space of the battery pack housing 100 as a whole, and may be formed as a plate having a sufficient size to cover the entirety of the internal space.

As such, the upper cover 200 of the battery pack case 20 of the present invention may have a double shielding structure including a plurality of separate module space covers 210 shielding each module space M and one battery pack cover 220 that shields the internal space of the battery pack housing 100 overall.

Figure 16:
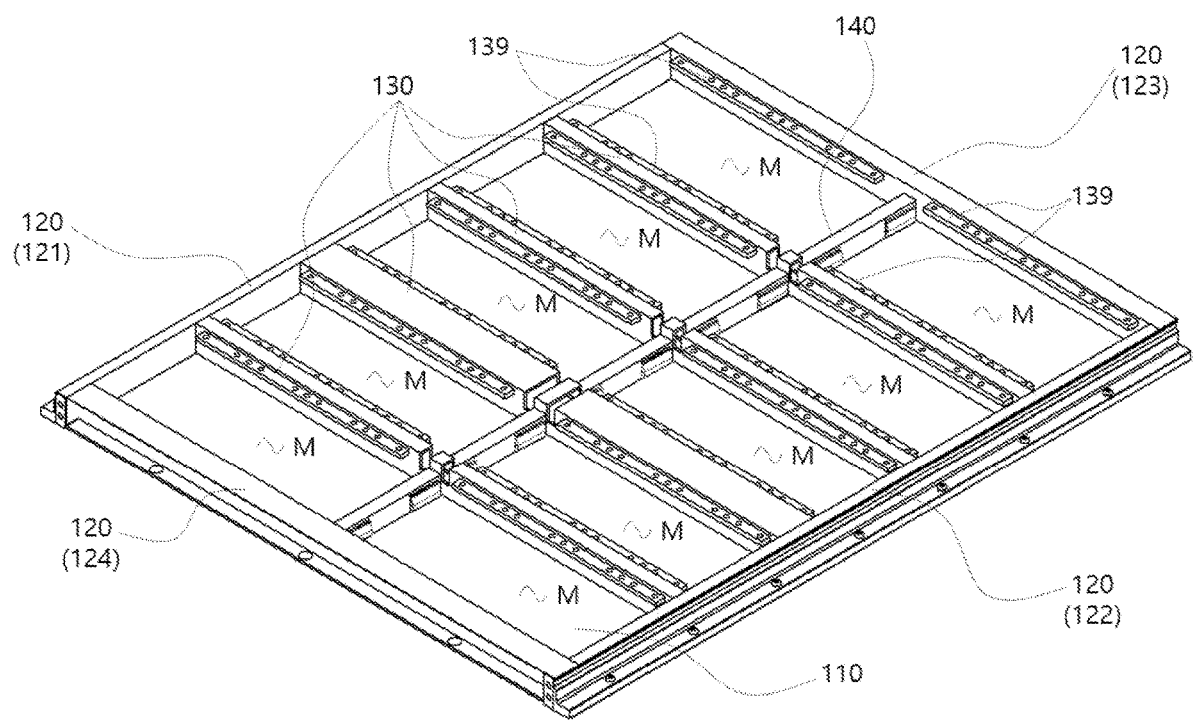
FIG. 16 shows again FIG. 5.
Figure 17:
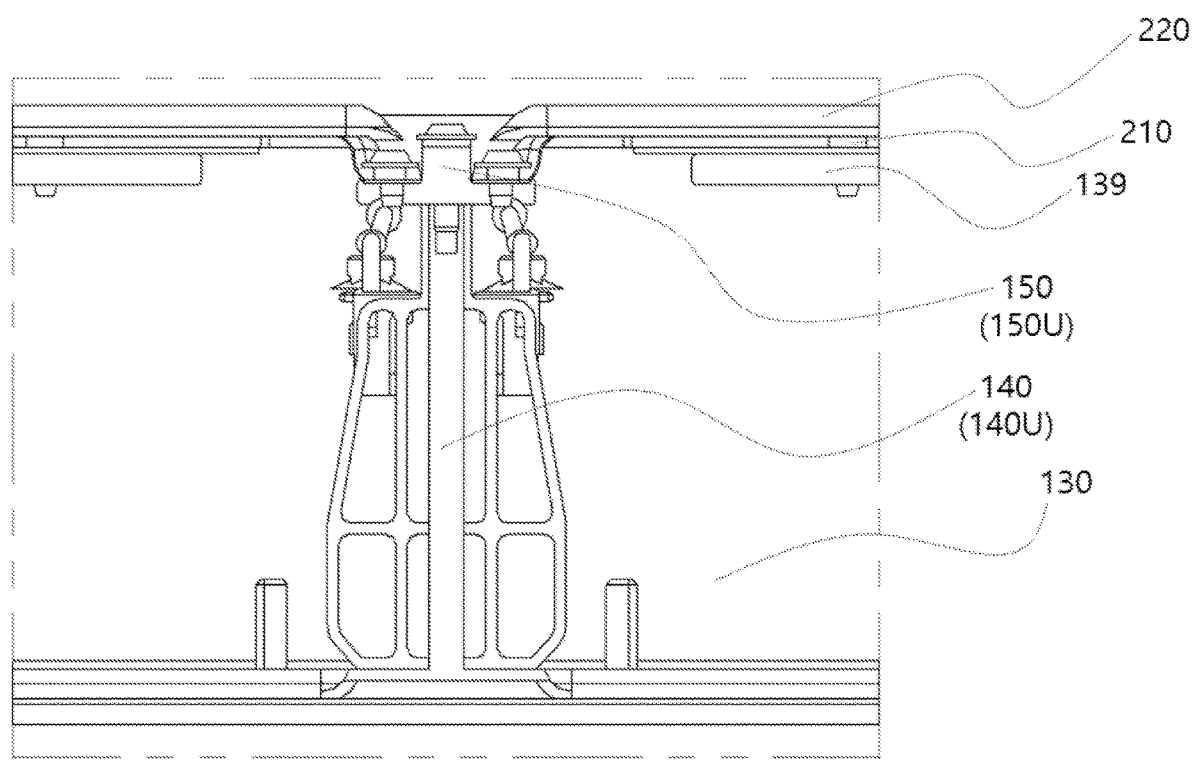
FIG. 17 is a cross-sectional view taken along line A-A' of FIG. 3.
Figure 18:
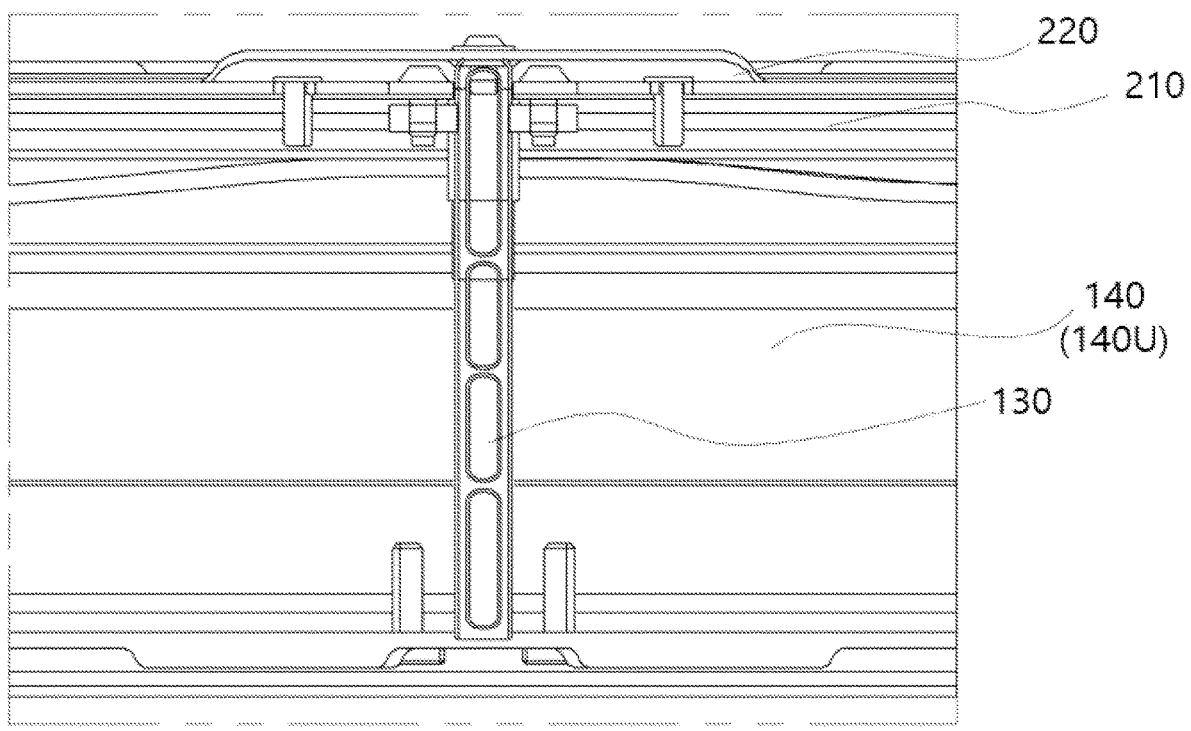
FIG. 18 is a cross-sectional view taken along line B-B' of FIG. 3.

Here, the plurality of module space covers 210 and the battery pack cover 220 may be spaced apart from each other by a predetermined distance. This is to secure a heat insulating layer by forming a space between the module space cover 210 and the battery pack cover 220, and as a specific means, as shown in FIG. 16, a seating structure 139 may be provided so that the module space cover 210 may be mounted on the horizontal frame 130 or on a side surface (e.g., a left surface and a right surface of the horizontal frame) of the horizontal frame 130 and the outer frame 120 as shown in FIG. 16. Here, the seating structure 139 may be formed in a position lower than an upper surface of the horizontal frame 130 and the outer frame 120 so that the module space cover 210 may be placed on the seating structure 139 and the battery pack cover 220 may be placed on the upper surface of the horizontal frame 130 and the outer frame 120, so that the module space cover 210 and the battery pack cover 220 may be spaced apart by a predetermined distance in a height direction. FIG. 17 is a cross-sectional view of A-A' of FIG. 3, and FIG. 18 is a cross-sectional view of B-B' of FIG. 3, illustrating a coupling structure between the horizontal frame 130, the seating structure 139 of the horizontal frame, the vertical frame 140, the vertical frame cover 150, the module space cover 210 and the battery pack cover 220.

Meanwhile, the battery pack 10 of the present invention may include the battery module 300 and the battery module 300 individually seated in each of the battery pack case 20 and a plurality of module spaces M of the battery pack case 20 as described above.

Here, the battery module 300 applied to the present invention may include a pouch-type battery cell assembly 350 formed by stacking pouch-type battery cells and a module case 360 for fixing the battery cell assembly 350, and the module case is simplified so that the battery cell assembly may be directly seated on the battery pack case.

Figure 19:
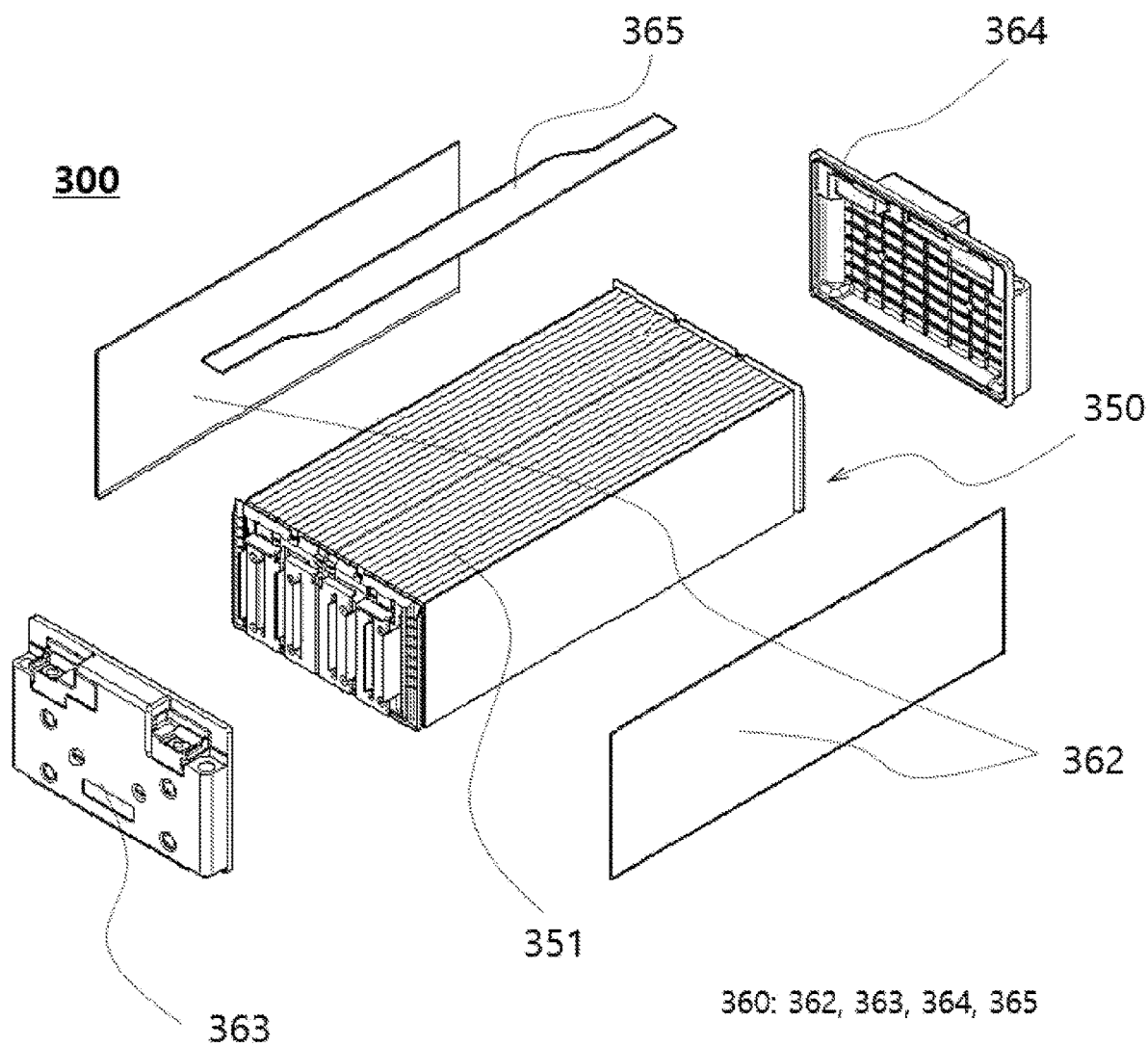
FIG. 19 is an exploded perspective view of a battery module according to an exemplary embodiment of the present invention.

More specifically, FIG. 19 shows a battery module according to an example of the present invention. As shown, the battery module 300 of the present invention may include the pouch-type battery cell assembly 350 and the module case 360, and the module case 360 of the present invention may include a side cover 362 surrounding both sides of the battery cell assembly 350, a front plate 363 covering the front surface, and a rear plate 364 covering the rear surface, and a connection bar 365 connecting the front plate and the rear plate may be additionally provided on an upper portion of the battery cell assembly.

That is, the battery module of the present invention may not have an upper cover and a lower cover surrounding the upper and lower portions of the battery cell assembly, unlike the general battery module of the related art described above, and in particular, the battery module of the present invention may not have a lower cover. This simplifies the module case by removing unnecessary parts from the module case of the battery module of the related art, and by reducing the size of the battery module, a storage ratio of the battery cell to a total volume of the battery pack may be increased.

In addition, in the battery module of the related art, a thermally conductive member (e.g., a thermally conductive resin layer) 330 is disposed on an upper portion of the module case lower cover 321 as described with reference to FIG. 4, whereby when the battery module 300 is seated on the plate 110 of the battery pack, the lower cover 321 of the module case may be located between the battery cell assembly 310 and the plate 110, degrading heat exchange performance between the battery cell assembly 310 and the plate 110, and in order to solve this problem, a second thermally conductive resin layer (not shown) should be additionally provided between the battery module 300 and the plate 110.

In contrast, in the battery module of the present invention, the module case does not have a lower cover so that the battery cell assembly 350 and the plate 110 are in direct contact with each other, whereby there is no need to provide a thermally conductive resin layer in the battery module itself and only a single thermally conductive resin layer provided between the battery module 300 and the plate 110 may have sufficient heat exchange performance, thus reducing the use of a thermally conductive resin, and since heat exchange takes place directly between the battery cell assembly 350 and the plate 110, heat-exchange performance may be further improved.

As described above, according to the present invention, a seating recess is formed in the horizontal frame, so that a connection member such as various busbars and wire harnesses required to configure a battery pack through the corresponding seating recess may be easily installed.

In addition, the connection member may pass through the horizontal frame through the seating recess, so that a height of the horizontal frame may be secured as much as possible at a level equal to a height of the outer frame, and thus airtightness of the horizontal frame side in the module space may be maximized.

In addition, by providing the sealing member in the seating recess, it is possible to reliably prevent gas and flames in a trigger module from propagating to other module spaces through the seating recess.

In addition, since the connection member and the sealing member are coupled to each other, it is easy to mount a coupling structure of the connection member and the sealing member in the seating recess, and the corresponding coupling structure may be firmly mounted in the seating recess.

In addition, convenience of assembly may be increased by configuring the vertical frame as a plurality of unit vertical frames and inserting and installing each unit vertical frame between the outer frame and the horizontal frame.

In addition, as the fastening recess is formed on the side of the vertical frame, the height of the vertical frame may be configured close to the height of the outer frame, so that airtightness toward the vertical frame in the module space may be secured.

In addition, as the vertical frame cover is provided on the upper portion of the vertical frame, airtightness toward the vertical frame in the module space may be further secured.

In addition, since the fastening recess is provided on the side of the vertical frame and a sensing member, that is, a CMU, may be fastened to the fastening recess, space utilization in the battery pack may be maximized, thereby increasing energy density of the battery pack.

In addition, the sensing member fixing unit may be provided in the fastening recess of the vertical frame, so that the sensing member may be firmly fixed to the fastening recess.

In addition, since the upper cover of the battery pack housing is designed to have a double shielding structure including the module space cover shielding each module space and the battery pack cover shielding the entire internal space of the battery pack housing, smoke and flames generated by the trigger module may be reliably blocked from propagating externally and being transferred to a cabin.

In addition, since the module space cover and the battery pack cover are separated, an insulating layer is formed therebetween, thereby preventing heat generated in the module space from being transferred to the outside.

In addition, since the battery module having a simplified module case is applied, a ratio of the battery cell to a total volume of the battery pack may be increased to increase an overall capacity of the battery, and since the battery cell assembly and the plate are in direct contact with each other, the use of a thermally conductive resin layer may be reduced and heat exchange performance may be further improved.

According to the present invention, a seating recess is formed in the horizontal frame, so that a connection member such as various busbars and wire harnesses required to configure a battery pack through the corresponding seating recess may be easily installed.

In addition, the connection member may pass through the horizontal frame through the seating recess, so that a height of the horizontal frame may be secured as much as possible at a level equal to a height of the outer frame, and thus airtightness of the horizontal frame side in the module space may be maximized.

In addition, as the fastening recess is formed on the side of the vertical frame, the height of the vertical frame may be configured close to the height of the outer frame, so that airtightness toward the vertical frame in the module space may be secured.

In addition, as the vertical frame cover is provided on the upper portion of the vertical frame, airtightness toward the vertical frame in the module space may be further secured.

In addition, by providing the sealing member in the seating recess, it is possible to reliably prevent gas and flames in a trigger module from propagating to other module spaces through the seating recess.

In addition, since the upper cover of the battery pack housing is designed to have a double shielding structure including the module space cover shielding each module space and the battery pack cover shielding the entire internal space of the battery pack housing, smoke and flames generated by the trigger module may be reliably blocked from propagating externally and being transferred to a cabin.

Although the exemplary embodiments of the present invention have been described above with reference to the accompanying drawings, a person skilled in the art to which the present invention pertains will understand that the present invention may be implemented in any other specific forms without changing the technical spirit or essential features thereof. Therefore, it should be understood that the embodiments described above are exemplary in all respects and not restrictive.

DETAILED DESCRIPTION OF MAIN ELEMENTS

10: battery pack
20: battery pack case
100: battery pack housing
110: plate
120: outer frame
130: horizontal frame
140: vertical frame
140U: unit vertical frame
150: vertical frame cover
150U: unit vertical frame cover
160: connection member
170: sealing member
180: sensing member
200: upper cover
210: module space cover
220: battery pack cover
300: battery module

What is claimed is:
1. A battery pack comprising:
a plate in which battery modules are placed;

an outer frame provided with a predetermined height at an outer portion of the plate;

at least one inner frame dividing an internal space so that the battery modules are placed in the internal space formed by the plate and the outer frame; and a connection member including at least one of a busbar electrically connecting the battery modules and a wire harness providing an electrical signal to electrical equipment provided in a battery housing, wherein the at least one inner frame includes at least one horizontal frame and at least one vertical frame, the internal space is divided into a plurality of areas by the horizontal frame and vertical frame, and the battery modules are individually seated in each area, wherein the horizontal frame includes at least one seating recess formed by indenting an upper surface of the at least one inner frame downward, wherein at least a portion of the connection member is seated in the seating recess, and wherein the connection member is configured to pass through the horizontal frame through the seating recess wherein the horizontal frame has the same height as the outer frame, and the vertical frame is lower than the horizontal frame wherein the connection member is located above the vertical frame, and a vertical frame cover covering the connection member is further provided above the vertical frame.

2. The battery pack of claim 1, wherein the at least one seating recess includes a central seating recess provided near an intersection at which the vertical frame and the horizontal frame meet.

3. The battery pack of claim 2, wherein the central seating recess includes a first central seating recess and a second central seating recess provided on both sides with respect to a center of the vertical frame.

4. The battery pack of claim 1, wherein the at least one seating recess includes a side seating recess provided on at least one of the ends of the at least one horizontal frame in a length direction.

5. The battery pack of claim 1, wherein the at least one vertical frame includes a plurality of unit vertical frames, and the at least one horizontal frame is disposed between two adjacent unit vertical frames among the plurality of unit vertical frames.

6. The battery pack of claim 5, further comprising:
a plurality of unit vertical frame covers provided at upper portions of the plurality of unit vertical frames to cover upper portions of the unit vertical frames, respectively.

7. The battery pack of claim 1, further comprising:
a sealing member coupled to the seating recess,
wherein the sealing member seals a space other than a space occupied by the connection member in the seating recess.

8. The battery pack of claim 7, wherein at least a portion of the connection member and the sealing member are coupled to each other.

9. The battery pack of claim 1, further comprising:
a plurality of module space covers provided above a plurality of module spaces formed by dividing the internal space in a grid form to shield the module spaces, respectively; and
a battery pack cover provided above the plurality of module space covers and above a battery pack housing to shield the internal space of the battery pack housing as a whole.

10. The battery pack of claim 9, wherein the plurality of module space covers and the battery pack covers are spaced apart from each other.

11. The battery pack of claim 9, further comprising:
a seating structure on which the module space cover is placed is provided on a side surface of the at least one horizontal frame, and
the seating structure is provided in a position lower than an upper surface of the at least one horizontal frame.

12. The battery pack of claim 1, wherein
the battery module includes a battery cell assembly including a pouch-type battery cell and a module case fixing the battery cell assembly, and
the pouch-type battery cell is directly seated on the plate through a thermally conductive member.

* * * * *